US010667982B2

(12) United States Patent
Noso et al.

(10) Patent No.: US 10,667,982 B2
(45) Date of Patent: Jun. 2, 2020

(54) MASSAGE APPARATUS

(71) Applicant: AISIN SEIKI KABUSHIKI KAISHA, Kariya-shi (JP)

(72) Inventors: Kazuo Noso, Kariya (JP); Takashi Ogiso, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 517 days.

(21) Appl. No.: 15/504,466

(22) PCT Filed: Aug. 11, 2015

(86) PCT No.: PCT/JP2015/004021
§ 371 (c)(1),
(2) Date: Feb. 16, 2017

(87) PCT Pub. No.: WO2016/027437
PCT Pub. Date: Feb. 25, 2016

(65) Prior Publication Data
US 2017/0231861 A1 Aug. 17, 2017

(30) Foreign Application Priority Data
Aug. 20, 2014 (JP) ................................. 2014-167038

(51) Int. Cl.
*A61H 7/00* (2006.01)
*A61H 9/00* (2006.01)
(Continued)

(52) U.S. Cl.
CPC ............... *A61H 9/005* (2013.01); *A47C 9/00* (2013.01); *A61H 7/00* (2013.01); *A61H 7/007* (2013.01);
(Continued)

(58) Field of Classification Search
CPC .......... A61H 9/005; A61H 7/00; A61H 7/007; A61H 15/00; A61H 15/0078; A61H 39/04;
(Continued)

(56) References Cited

U.S. PATENT DOCUMENTS

2010/0145245 A1* 6/2010 Chen .................... A61H 9/0078
601/149

FOREIGN PATENT DOCUMENTS

DE  10 2007 051 759 A1  5/2009
JP  2000-229107 A  8/2000
(Continued)

OTHER PUBLICATIONS

Foistner, Andreas; "Seat bearing surface of the vehicle seat." Aug. 13, 2013, WO-2015022331-A1, EPO Patent Translation (Year: 2013).*

(Continued)

*Primary Examiner* — Michael J Tsai
*Assistant Examiner* — Matthew Standard
(74) *Attorney, Agent, or Firm* — Oblon, McClelland, Maier & Neustadt, L.L.P.

(57) ABSTRACT

A massage apparatus includes: a base; a first air bag and a second air bag, the first air bag and the second air bag vertically overlapped with each other, the first air bag being disposed on an upper side of the second air bag, and the first air bag and the second air bag being joined to each other at an overlapped site; an air injection and discharge section connected to the first air bag for injecting air into and discharging air from the first air bag; a coupling section including a through hole arranged to communicate the air bags with each other is provided at a site where the air bags is joined to each other; and a fixing section rotatably fixing the first air bag to the base provided on a portion of the first (Continued)

air bag, the portion being not overlapped with the second air bag.

7 Claims, 11 Drawing Sheets

(51) Int. Cl.
*B60N 2/90* (2018.01)
*A61H 39/04* (2006.01)
*A47C 9/00* (2006.01)
*A61H 15/00* (2006.01)

(52) U.S. Cl.
CPC ............. *A61H 15/00* (2013.01); *A61H 39/04* (2013.01); *B60N 2/914* (2018.02); *B60N 2/976* (2018.02); *A61H 2201/0103* (2013.01); *A61H 2201/1238* (2013.01)

(58) Field of Classification Search
CPC .... A61H 2201/0103; A61H 2201/1238; A61H 2201/0149; A61H 2201/0142–0146; B60N 2/976; B60N 2/914; A61G 7/05776
See application file for complete search history.

(56) References Cited

FOREIGN PATENT DOCUMENTS

| | | | |
|---|---|---|---|
| JP | 2002-177358 A | | 6/2002 |
| JP | 2002177358 A | * | 6/2002 |
| JP | 2005-46214 A | | 2/2005 |
| JP | 2005-198742 A | | 7/2005 |
| JP | 2013-27650 A | | 2/2013 |
| JP | 2013-248028 A | | 12/2013 |
| WO | WO 2015/022331 A1 | | 2/2015 |
| WO | WO-2015022331 A1 * | 2/2015 | ............. B60N 2/976 |

OTHER PUBLICATIONS

International Search Report dated Oct. 6, 2015 in PCT/JP2015/004021 filed Aug. 11, 2015.
Extended European Search Report dated Jul. 14. 2017 in Patent Application No. 15833978.8.
International Preliminary Report on Patentability and Written Opinion dated Feb. 21, 2017 in PCT/JP2015/004021 (with English translation).

* cited by examiner

മassage APPARATUS

MASSAGE APPARATUS

TECHNICAL FIELD

The present invention relates to a massage apparatus that expands and contracts an air bag to perform massage.

BACKGROUND ART

As a representative effective human hand massage method, there is a kneading method which is referred to as a linear petrissage. This is hand massage where a thumb is linearly moved with respect to muscle fibers while pressure is applied to a site to be treated with the thumb, and stiffness is relieved.

As an apparatus that implements a kneading method similar to the linear petrissage by use of air bags for massage, for example, a massage apparatus described in PTL 1 is known. The massage apparatus described in PTL 1 includes a movable support plate that is mounted on a base member of an apparatus body, and is capable of advancing and retreating forward and backward toward a shoulder of a user, a pair of sandwiching support plates that is provided in the movable support plate, and is capable of advancing and retreating toward the back of the right and left lateral sections of a neck of the user, and acupressure members that protrude from the respective sandwiching support plates. Additionally, the apparatus includes a first air bag that is disposed between the base member and the movable support plate, a second air bag disposed between the movable support plate and the sandwiching support plates, an air supply and discharge means for supplying and discharging air to and from the respective air bags, and a control means for controlling operation of the air supply and discharge means. In this massage apparatus, the control means controls the air supply and discharge means, supplies air to the first air bag during time T1, and thereafter supplies air to the second air bag while discharging the air of the first air bag during time T2. The first air bag expands, so that the acupressure members press shoulder near a base of the neck of the user. Additionally, the air of the first air bag is discharged, and the air is supplied to the second air bag, so that the acupressure members move toward a head of the user while pressing the back of the lateral sections of the neck of the user. Thus, the massage apparatus described in PTL 1 employs a method for attaining the kneading method similar to the linear petrissage by controlling supply and discharge of the first air bag and the second air bag in accordance with a predetermined order.

As a treatment apparatus using air bags, a massage apparatus described in PTL 2 is known. In the massage apparatus, a pair of second air bags for pressing scapulae is partially overlapped with a first air bag for pressing a backbone, and the pair of second air bags is expanded, and thereafter the first air bag is expanded, so that the second air bags overlapped on the first air bag move right and left. Consequently, the massage apparatus can operate so as to open intercostal muscle of a user.

In addition, as a massage apparatus that aims simplification and cost reduction of an air sending system coupled to air bags, a massage apparatus described in PTL 3 is known. In the massage apparatus, two air bags having the same size are coupled so as to be overlapped with each other by use of a coupling means, and are communicated with each other through the coupling means, air is supplied and discharged by an intake/exhaust port provided in one of the air bags, so that it is possible to attain expansion and contraction of the two air bags.

CITATION LIST

Patent Literature

PTL 1: Japanese Patent Application Laid-Open No. 2005-46214
PTL 2: Japanese Patent Application Laid-Open No. 2005-198742
PTL 3: Japanese Patent Application Laid-Open No. 2002-177358

SUMMARY OF INVENTION

Technical Problem

However, in the massage apparatus described in PTL 1, the number of components configuring the apparatus is increased, and the structure is completed. Additionally, in the massage apparatus described in PTL 1, the components need to be operated in accordance to a predetermined procedure, and control is also complicated. Therefore, in the massage apparatus described in PTL 1 has disadvantages that a high cost is required for the complicated structure and control.

Also, in the massage apparatus described in PTL 2, the first air bag and the second air bag are separated from each other, and therefore air injection mechanisms are separately needed. Additionally, in the massage apparatus described in PTL 2, the timing of expansion of the first air bag is different from the timing of expansion of the second air bag, and therefore the number of valves need to be increased, and there is a disadvantage that control is further complicated.

In the massage apparatus described in PTL 3, while the air sending system can be simplified with respect to the two air bags, a portion pressed by the air bags is limited to only a specified part, and the pressing portion cannot be moved. Therefore, the massage apparatus described in PTL 3 cannot attain the kneading method similar to the linear petrissage.

The present invention provides a massage apparatus that attains the kneading method similar to the linear petrissage with a simple configuration and control.

Solution to Problem

The present invention provides a massage apparatus including: a base; a pair of air bags including a first air bag and a second air bag, the first air bag and the second air bag being vertically overlapped while being displaced from each other, the first air bag being disposed on an upper side of the second air bag, and the first air bag and the second air bag being joined to each other at an overlapped site; and an air injection and discharge section that is connected to the first air bag, injects air into the first air bag, and discharges the air from the first air bag, wherein a coupling section including a through hole for communicating the pair of air bags with each other is provided at a site where the pair of air bags is joined to each other, and a fixing section that rotatably fixes the first air bag to the base is provided in a portion of the first air bag, the portion being not overlapped with the second air bag.

The massage apparatus of the present invention implements the linear petrissage by injecting and discharging air to and from the pair of vertically overlapped air bags for massage through the single air injection and discharge section. Accordingly, it is possible to provide a massage apparatus having a similar massage effect to human hand massage with a simple structure without requiring complicated control.

Further features of the present invention will be apparent from the description of the following embodiments exemplified with reference to the attached drawings.

DESCRIPTION OF EMBODIMENTS

Hereinafter, exemplary embodiments for implementing the present invention will be described in detail with reference to the drawings. However, the size, the materials, the shapes, and the relative positions of components described in the following embodiments are arbitrary, and can be changed in accordance with a configuration of an apparatus to which the present invention is applied, or various conditions. Additionally, the same reference numerals in the drawings are used in the drawings in order to indicate the same or functionally similar components. In this specification, an upper side and a lower side related to a pair of overlapped air bags indicate upper and lower positions in relative relation of the overlapped air bags, and is not limited to upper and lower positions in the gravity direction.

Embodiment 1

Figure 1:
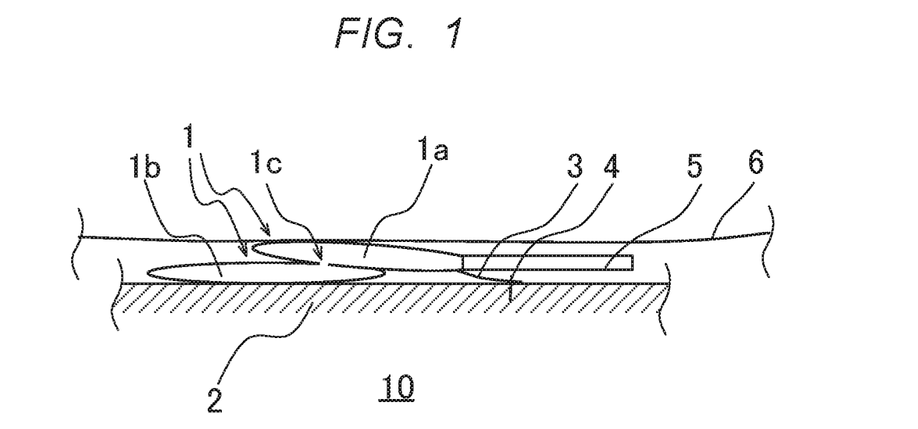
FIG. 1 is a sectional view illustrating a main section of a massage apparatus according to Embodiment 1 of the present invention, and illustrates a state before air is injected into air bags.
Figure 3:
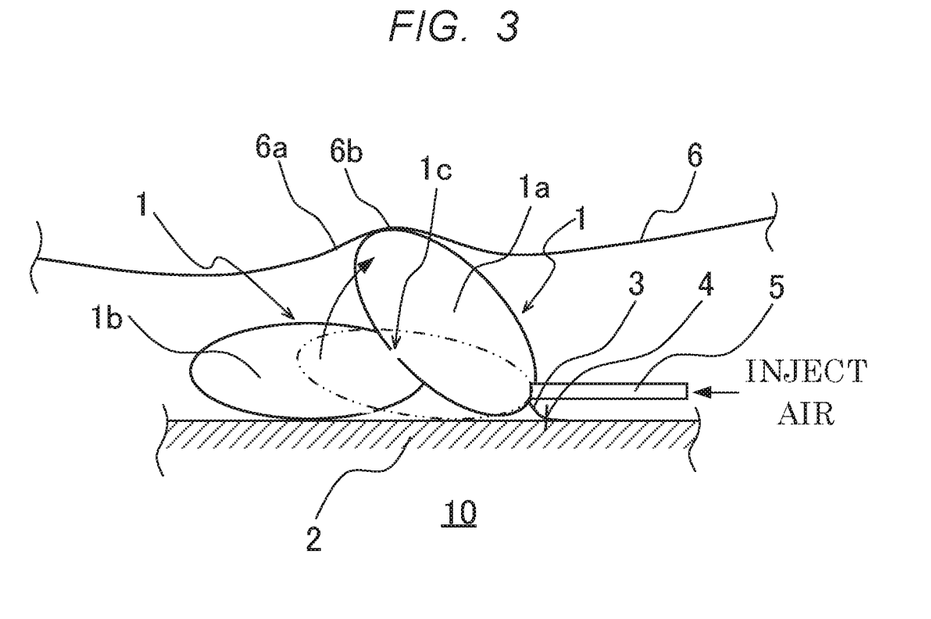
FIG. 3 is a sectional view illustrating a state where air is further injected into the air bags of the massage apparatus in FIG. 2.
Figure 4:
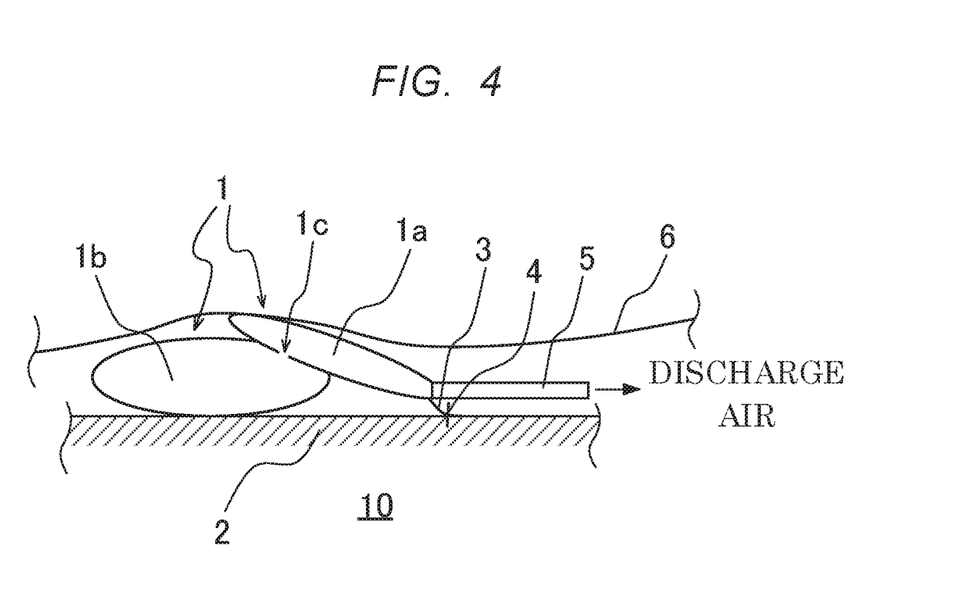
FIG. 4 is a sectional view illustrating a state where the air is discharged from the air bags of the massage apparatus in FIG. 3.
Figure 5:
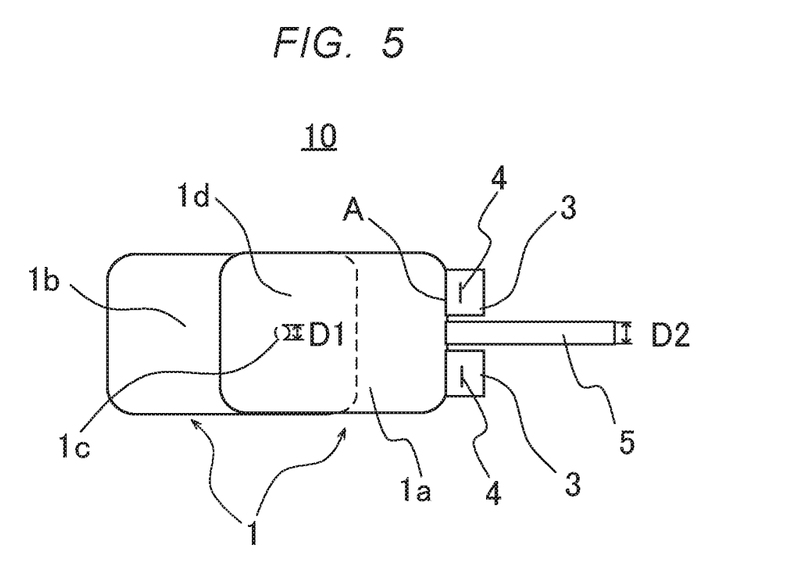
FIG. 5 is a plan view illustrating the main section of the massage apparatus in FIG. 1.

A massage apparatus 10 according to Embodiment 1 of the present invention will be described with reference to FIG. 1 to FIG. 5. FIG. 1 to FIG. 5 illustrate the massage apparatus 10 according to Embodiment 1 of the present invention. FIG. 1 is a sectional view illustrating a main section of the massage apparatus 10 according to the present invention, and illustrates a state before air is injected into air bags. FIG. 5 is a plan view of the main section of the massage apparatus 10 in FIG. 1 as viewed from a top. In FIG. 1 to FIG. 5, a pump and the like connected to an air injection and discharge tube 5 are omitted in order to simplify the description.

Figure 11:
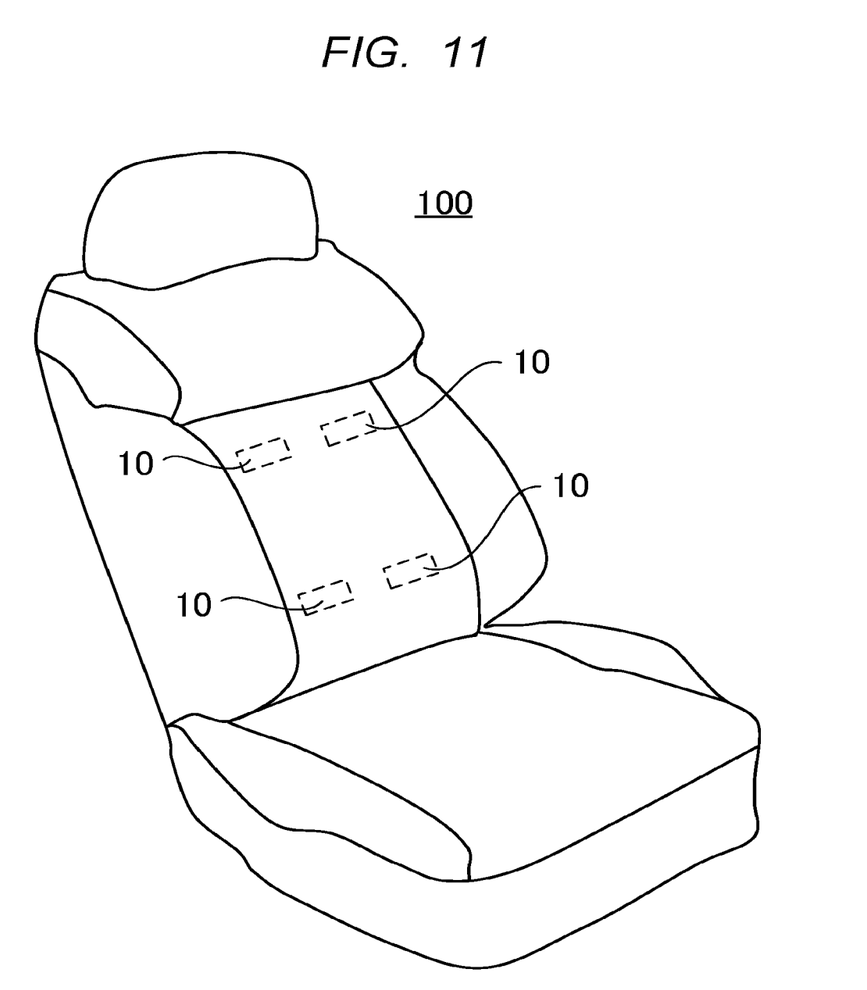
FIG. 11 is a perspective view illustrating a chair type massager to which the massage apparatus according to the present invention is applied.

The massage apparatus 10 of the present invention can be applied to various types of massagers such as a chair type massager, a foot massager, and an arm massager, and a seat for a vehicle. In this embodiment, the massage apparatus 10 is applied to a chair type massager including a seat for a vehicle. In a case where the massage apparatus 10 of the present invention is applied to a chair type massager 100, the massage apparatus 10 of the present invention can be provided such that the air bags provided in the massage apparatus 10 come into contact with a back, etc. of a person who sits on the massager 100 (user), as illustrated in FIG. 11. More specifically, the massage apparatus 10 can be provided such that the air bags come into contact with a neck, a shoulder, a waist, and legs, etc. of the user. The massage apparatus 10 can be mounted in the arbitrary direction. For example, the massage apparatus 10 can be mounted in such a direction that motion of the air bags is orthogonal or parallel to muscle fibers of a site to be treated.

As described below, in the massage apparatus 10 of the present invention, expansion and contraction of the air bags are repeated in accordance with injection of the air into the air bags and discharge of the air from the inside of the air bags. Consequently, the massage apparatus 10 can perform operation similar to the linear petrissage where a person who gives massage presses a site to be treated with his/her thumb, and moves his/her thumb while applying pressure to the site to be treated.

As illustrated in FIG. 1 and FIG. 5, the massage apparatus 10 is provided with a pair of air bags 1 for massage (first air bag 1a, second air bag 1b). Furthermore, the massage apparatus 10 is provided with a base 2 where the pair of air bags 1 is installed, and an air injection and discharge tube 5 (air injection and discharge section) for allowing air to be injected into the air bags 1 and allowing the air to be discharged from the air bags 1.

The pair of air bags 1 includes a first stage air bag (first air bag) 1a made of a flexible member having an arbitrary shape, and a second stage air bag (second air bag) 1b made of a flexible member similarly. The air bag 1a and 1b are vertically overlapped with each other while being displaced from each other, and are joined to each other at the overlapped site. The air bag 1a and the air bag 1b are joined by, more specifically, a means such as welding and bonding.

The air injection and discharge tube 5 is connected to a right place of the overlapped upper (first stage) air bag 1a, and air is injected into the upper air bag 1a, and the air is discharged from the upper air bag 1a. As a pump (air injection and discharge apparatus) for supplying (injecting) air and sucking (discharging) the air through the air injection and discharge tube 5, an apparatus used in an existing massager using an air bag can be applied.

In the site where the upper and lower (first stage and second stage) air bags 1a, 1b are joined, a coupling section 1d including a through hole 1c for allowing internal spaces of the upper and lower air bag 1a, 1b to be connected (communicated) with each other is provided. Herein, the through hole 1c is formed such that an inner diameter D1 of the through hole 1c is smaller than an inner diameter D2 of the air injection and discharge tube 5, as illustrated in FIG. 5. The coupling section 1d that is the site where the air bags 1a, 1b are joined can be formed such that the air bags 1a, 1b are welded, bonded or the like to each other around the through hole 1c.

In a portion not overlapped with the lower (second stage) air bag 1b, of the upper (first stage) air bag 1a, fixing sections 3 for rotatably fixing the upper air bag 1a to the base 2 are provided. In the massage apparatus 10 illustrated in FIG. 5, the fixing sections 3 are provided as a pair of plate-like members provided on one edge A, not overlapped with the lower (second stage) air bag 1b, of the upper (first stage) air bag 1a. The fixing sections 3 are fixed to the base 2 by mounting members 4. Herein, the configuration of the fixing sections 3 are not limited to the above configuration, and may be a configuration where the upper air bag 1a can be rotatably fixed to the base 2. Therefore, the fixing sections 3 may be a single plate-like member, or may be formed as a part of the upper air bag 1a. As the mounting members 4, wires, screws, fibers (yarn), hinges, or the like can be used. The lower air bag 1b particularly does not need to be fixed, but may be bonded to the base 2 by use of an arbitrary bonding agent or the like.

Figure 2:
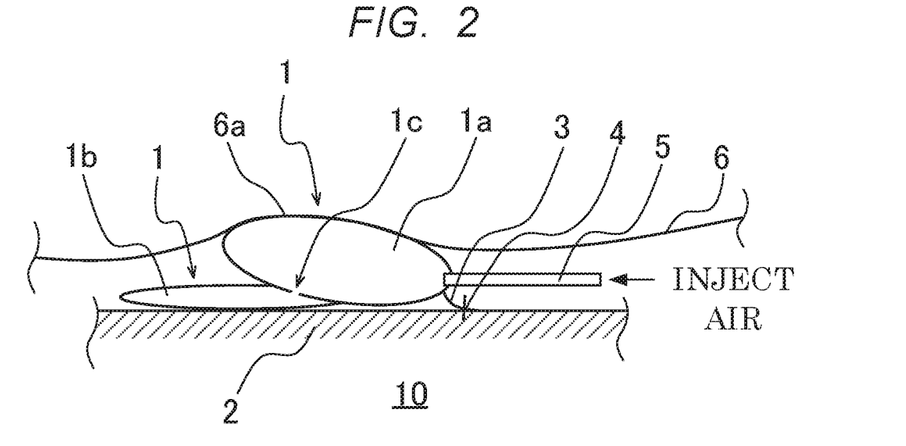
FIG. 2 is a sectional view illustrating a state where air is injected into the air bags of the massage apparatus in FIG. 1.

Now, operation of the massage apparatus 10 according to the present invention will be described with reference to FIG. 1 to FIG. 4. FIG. 1 illustrates the main section of the massage apparatus 10 according to the present invention. FIG. 2 and FIG. 3 each illustrate the massage apparatus 10 in a state where the air is injected into the air bags 1, and the FIG. 4 illustrates the massage apparatus 10 in a state where the air is discharged from the air bags 1.

A user leans against the massager 100 mounted with the massage apparatus 10 according to the present invention to sit or lie, etc. on the massage apparatus 10, so that body weight is applied to the base 2 of the massage apparatus 10. Then, when air is injected into the upper (first stage) air bag 1a through the air injection and discharge tube 5 by the pump (not illustrated) or the like, the upper (first stage) air bag 1a first expands. Consequently, the massage apparatus 10 is brought into the state shown in FIG. 2 from the state shown in FIG. 1.

In the state shown in FIG. 2 (time point when the upper air bag 1a expands), a site 6a on a contour line 6 representing a contour of a body of the user is a site of the body of the user, to which the air bags 1 apply the largest force (maximum weight applied point). At this time, a diameter D1 of the through hole 1c of the coupling section 1d is smaller than the inner diameter D2 of the air injection and discharge tube 5, and an amount of air passing through the through hole 1c is relatively less than an amount of air passing through the air injection and discharge tube 5, and therefore the lower (second stage) air bag 1b does not yet expand sufficiently. When air is further injected from the state shown in FIG. 2, the upper (first stage) air bag 1a sufficiently expands, the amount of air passing through the through hole 1c is increased, and the lower (second stage) air bag 1b expands to be brought into the state shown in FIG. 3.

In a process from the state shown in FIG. 2 to the state shown in FIG. 3, the lower (second stage) air bag 1b gradually expands, so that the lower (second stage) air bag 1b acts so as to push the upper (first stage) air bag 1a up. When the upper (first stage) air bag 1a is lifted by the action of the lower air bag 1b, the upper (first stage) air bag 1a rotates with the fixing sections 3 as an axis, from a position of the upper air bag 1a in the state shown in FIG. 2 illustrated by a two-dot chain line in FIG. 3 to a position of a solid line along the arrow in the figure. That is, the lower air bag 1b gradually expands, so that the upper air bag 1a is pushed up, and rotates with the fixing sections 3 as the axis in the direction opposite to the base 2. In accordance with the rotation of the upper air bag 1a, the site of the body of the user, to which the air bags 1 apply the largest force (maximum weight applied point) moves from the site 6a to a site 6b on the contour line 6 in the rotation direction of the upper air bag 1a. At this time, in order to allow the upper air bag 1a to rotate without hindrance, the fixing sections 3 can be fixed to the base so as to be located outside a lower section of the air bag 1a.

Thereafter, when the air is discharged from the air bags 1 through the air injection and discharge tube 5, the upper (first stage) air bag 1a contracts as illustrated in FIG. 4. When the air is further discharged, the lower (second stage) air bag 1b contracts. When the lower air bag 1b contracts, the upper air bag 1a rotates in the direction of the base 2 which is the direction opposite to the expansion direction, and returns to the state of FIG. 1. The discharge of air may be performed by suction of air by the pump (not illustrated) through the air injection and discharge section 5, or may be performed by use of the body weight of the user.

In a series of movement of the air bags 1 illustrated in FIG. 1 to FIG. 4, the site of the user, to which the air bags 1 apply the largest pressing force (maximum weight applied point) moves from the site 6a on the contour line 6 in FIG. 2 to the site 6b on the contour line 6 in the FIG. 3 in accordance with the movement (rotation) of the upper air bag 1a. In the massage apparatus 10 of this embodiment, the maximum weight applied point by the air bags 1 is moved in accordance with the movement of the upper air bag 1a, so that it is possible to implement operation similar to the linear petrissage where a person who gives massage presses a site to be treated with his/her thumb, and moves his/her thumb while applying pressure to the site to be treated.

Figure 6:
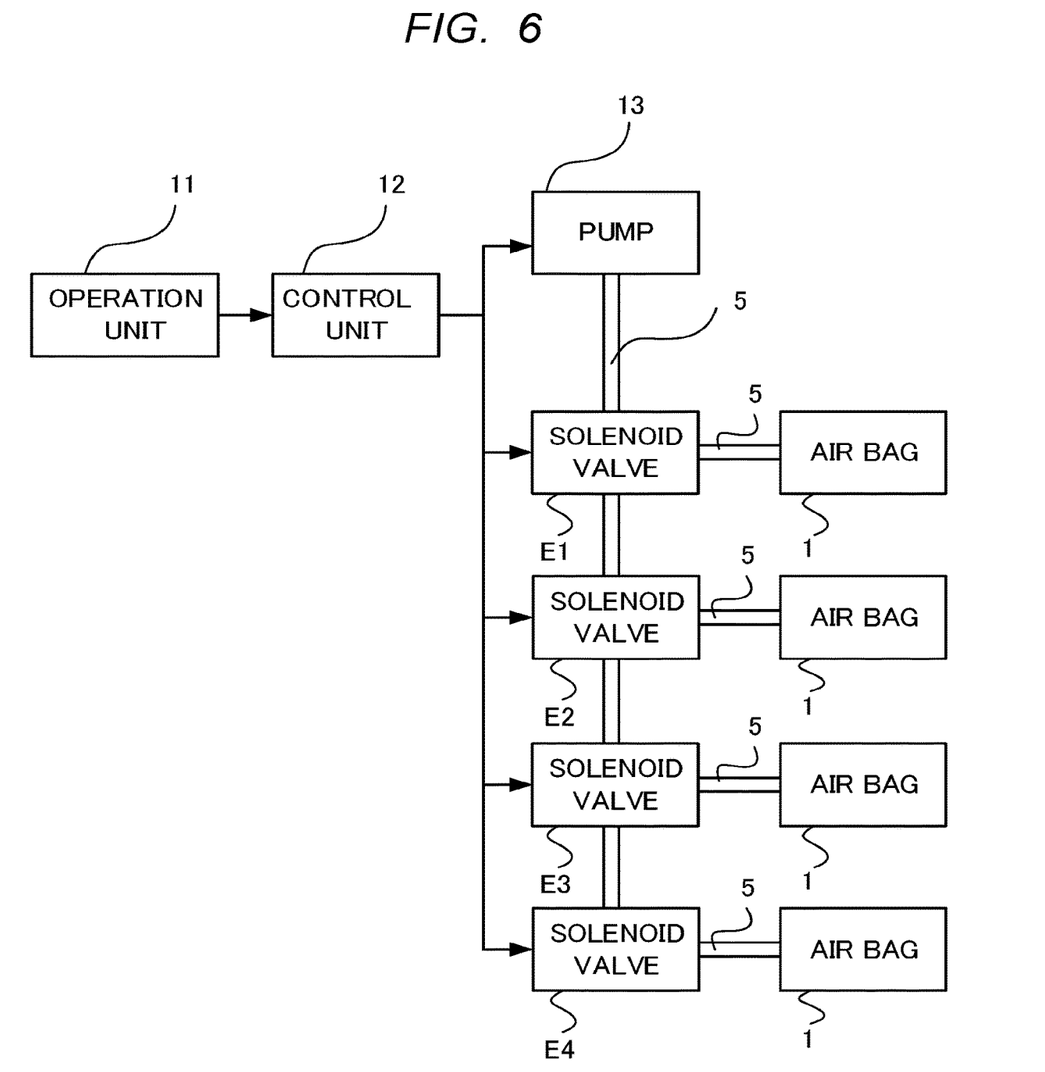
FIG. 6 is a block diagram of a control unit and the like of the massage apparatus according to Embodiment 1 of the present invention.

Now, control of injection and discharge of air in the massage apparatus 10 according to this embodiment will be described with reference to FIG. 6. FIG. 6 is a block diagram of a control unit 12 and the like in this embodiment. An operation unit 11, the control unit 12, and a pump 13 are provided in the massager 100. The control unit 12 can be configured by a CPU, a MPU, and the like. Herein, the control unit 12 is connected to the operation unit 11 to which operation to the massager 100 is input by a user, the pump 13 for injecting air to the air bags 1 and discharging the air from the air bags 1, and solenoid valves E provided in the air injection and discharge tubes 5 connected to the air bags 1. Additionally, the pump 13 is connected to the air bags 1 through the air injection and discharge tubes 5. In FIG. 6, the four air bags 1 are provided. However, the number of the air bags 1 are not limited to this. The number of the air bags 1 to be provided may be one, or may be two or more. In FIG. 6, four solenoid valves E1, E2, E3, E4 are provided corresponding to the four air bags 1. However, the number of the solenoid valves E is also not limited to this, and an arbitrary number of solenoid valves E corresponding to the number of the air bags 1 can be provided.

The control unit 12 can control injection and discharge of air by the pump 13 on the basis of an input signal from the operation unit 11, and can control operation of each solenoid valve E. The pump 13 can supply air to the air injection and discharge tube 5 and suck the air from the air injection and discharge tube 5 on the basis of a signal from the control unit 12. Each solenoid valve E can move to a position where the injection of air to the air bags 1 is permitted, or a position where the discharge of air from the air bags 1 is permitted, on the basis of the signal of the control unit 12.

When the user inputs the operation of the massager 100 to the operation unit 11, the operation unit 11 transmits an input signal to the control unit 12. The control unit 12 operates the pump 13 on the basis of the input signal received from the operation unit 11. The control unit 12 identifies the air bags 1 to be operated on the basis of air bag identification information included in the input signal received from the operation unit 11, and transmits an air supply operation signal to the solenoid valve E corresponding to the air bags 1. When the solenoid valve E receives the air supply operation signal from the control unit 12, the solenoid valve E moves to the position where the injection of air to the air bags 1 is permitted, and injects air to the air bags 1 until the air bags 1 expand. When the air bags 1 sufficiently expand, the control unit 12 transmits a discharge operation signal to the solenoid valve E, the solenoid valve E moves to the position where the discharge of air from the air bags 1 is permitted, on the basis of the discharge operation signal, and discharges the air from the air bags 1 until the air bags 1 contract. When the air bags 1 contract, the control unit 12 causes the solenoid valve E to perform similar operation again, and expansion and contraction of the air bags 1 are repeated, so that it is possible to implement operation similar to the linear petrissage by the air bags 1. The control unit 12 can determine expansion and contraction of the air bags 1 on the basis of elapsed time from time of transmission of the air supply operation signal and the discharge operation signal to the solenoid valve E.

As described above, the massage apparatus 10 according to this embodiment includes the base 2, and the pair of air bags 1 that is installed in the base 2, vertically overlaps with each other while being displaced from each other, and is joined at the overlapped site. Furthermore, the massage apparatus 10 includes the air injection and discharge tube 5, which is connected to the overlapped upper air bag (first air bag) 1*a* to inject air to the upper air bag 1*a* and discharge the air to from the upper air bag 1*a*. Additionally, the coupling section 1*d* including the through hole 1*c* for communicating the pair of air bags 1 is provided at the site where the pair of air bags 1 is joined to each other. Furthermore, in the portion, not overlapped with the lower air bag (second air bag) 1*b*, of the upper air bag 1*a*, the fixing sections 3 for rotatably fixing the upper air bag 1*a* to the base 2 are provided. According to this configuration, in the massage apparatus 10, the upper air bag 1*a* expands in accordance with air injected from the air injection and discharge tube 5, and the lower air bag 1*b* then expands in accordance with the air flowing in from the upper air bag 1*a* through the coupling section 1*d*, and pushes the upper air bag 1*a* up to rotate the upper air bag 1*a* with the fixing sections 3 as the axis. In the massage apparatus 10, the maximum weight applied point by the air bags 1 is moved in accordance with the rotation of the upper air bag 1*a*, and therefore it is possible to implement operation similar to the linear petrissage where a person who gives massage presses a site to be treated with his/her thumb, and moves his/her thumb while applying pressure to the site to be treated. Additionally, in the massage apparatus 10, the expansion and contraction of the pair of air bags 1 can be performed by only one air injection and discharge tube 5, and the operation similar to the linear petrissage can be implemented by the expansion and contraction of the air bags 1. Therefore, in the massage apparatus 10, while the operation similar to the linear petrissage is implemented, the structure and the control of the expansion and contraction of the air bags 1 can be simplified, and cost can be reduced, compared to conventional massage apparatuses.

In the massage apparatus 10 according to this embodiment, the storage capacity of air of the lower air bag 1*b* is made larger than the storage capacity of air of the upper air bag 1*a*. This is effective to stabilize the operation of the air bags, and to be unlikely to displace the air bags from a site to be treated.

In the massage apparatus 10 according to this embodiment, the air injection and discharge tube 5 is connected to the upper air bag 1*a* near portions, on which the fixing sections 3 are mounted, of the upper air bag 1*a*. In a case where the air injection and discharge tube 5 is thus connected to the upper air bag 1*a*, also when the upper air bag 1*a* is lifted up by the lower air bag 1*b*, it is possible to prevent movement of a connecting portion of the air injection and discharge tube 5 and the upper air bag 1*a*. Therefore, also when the upper air bag 1*a* is lifted up by the lower air bag 1*b*, it is possible to stably perform the injection of air to the air bags 1 and the discharge of air from the air bags 1.

In the massage apparatus 10 according to this embodiment, the air injection and discharge tube 5 is directly connected to the upper air bag 1*a*. However, the air injection and discharge tube 5 may be connected to the upper air bag 1*a* through an arbitrary connecting member. In this case, the connecting member functions as the air injection and discharge section, and therefore the diameter D1 of the through hole 1*c* is made smaller than an inner diameter of the connecting member.

Furthermore, in the massage apparatus 10 according to this embodiment, each solenoid valve E is configured so as to be movable to the position where the injection of air to the air bags 1 is permitted, or the position where the discharge of air from the air bags 1 is permitted, on the basis of a signal from the control unit 12. On the other hand, the solenoid valve E may be further configured so as to be movable to a position where the injection and the discharge of air is prohibited. In this case, after the air bags 1 are expanded, the solenoid valve E is moved to the above position, so that the air bags 1 can be maintained in an expanded state. Additionally, the solenoid valve E may not be provided, and the expansion and contraction of the air bags 1 may be performed by only control of the pump 13.

Embodiment 2

Now, a massage apparatus 20 according to Embodiment 2 provided with a valve that opens and closes a passage of air in a coupling section of a pair of air bags will be described with reference to FIG. 7 to FIG. 10. Operation of air bags 21, a control unit, and a pump in the massage apparatus 20 according to Embodiment 2 are similar to the operation in the massage apparatus according to Embodiment 1, and therefore differences will be mainly described.

Generally, in a case where massage is given by a hand of a human, when a site to be treated is slowly pressed by a finger, and the finger is quickly separated from the site to be treated, it is possible to obtain more preferable massage feeling. In this embodiment, the valve for opening and closing the passage of air in the coupling section of the air bags is used. In accordance with operation of the valve, an inflow amount of air to a lower air bag is decreased when the air bags expand, and an outflow amount of air from the lower air bag is increased when the air bags contract. In this embodiment, thus, it is possible to obtain the above preferable massage feeling.

Figure 7:
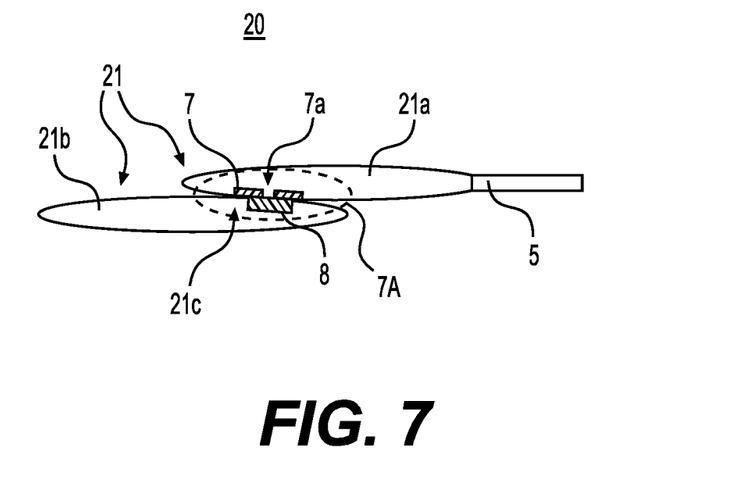
FIG. 7 is a sectional view illustrating a massage apparatus according to Embodiment 2 of the present invention.
Figure 7A:
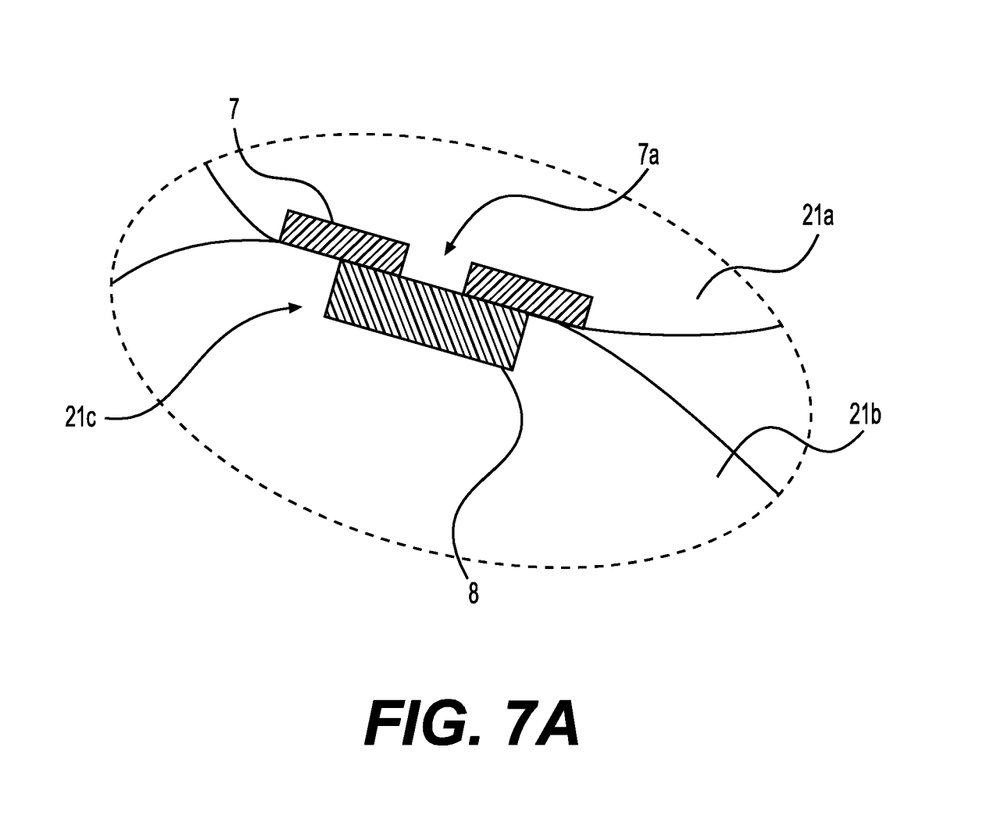
FIG. 7A is a zoomed-in view of a portion of sectional view shown in FIG. 7.
Figure 8:
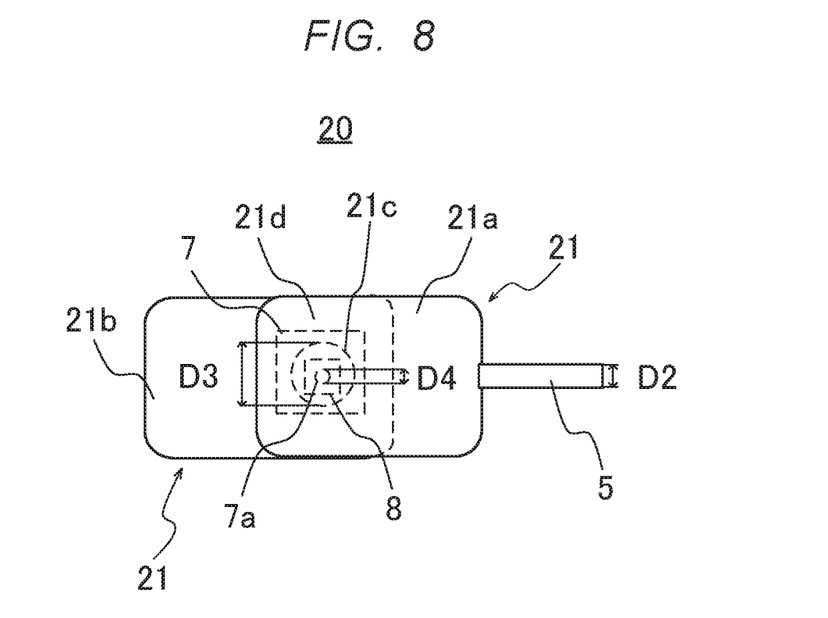
FIG. 8 is a plan view illustrating a main section of the massage apparatus in FIG. 7.
Figure 9:
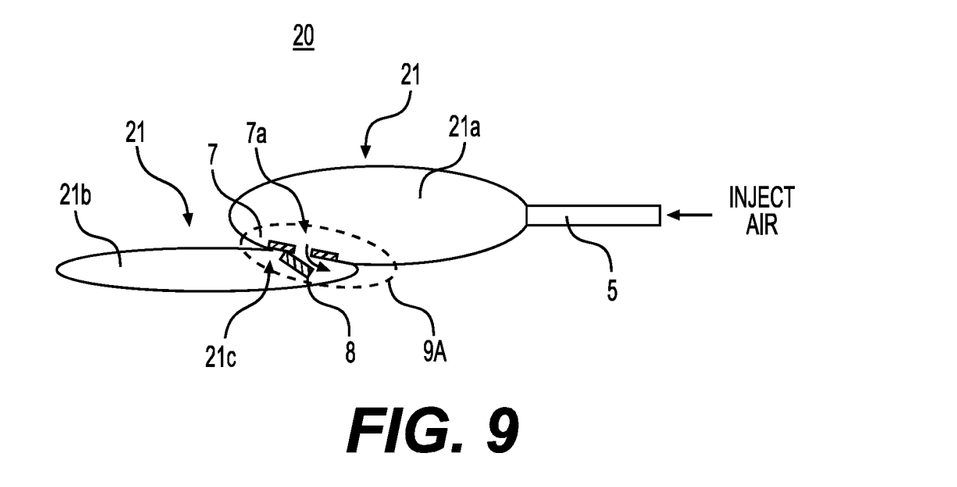
FIG. 9 is a sectional view illustrating operation of a valve in a case where air is injected into the air bags of the massage apparatus in FIG. 7.
Figure 9A:
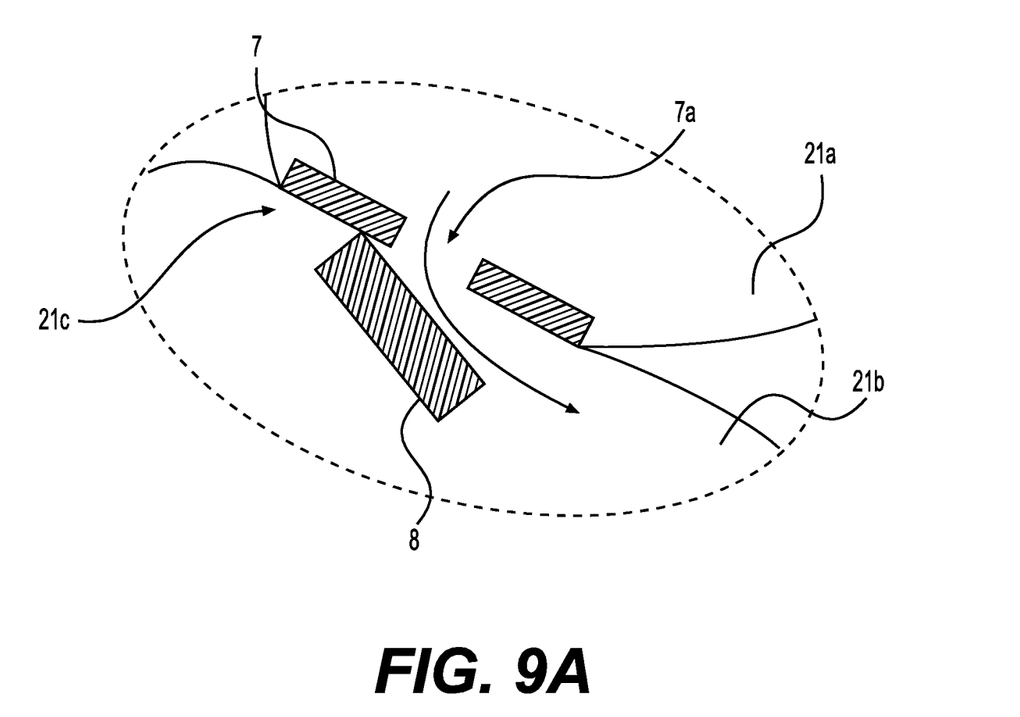
FIG. 9A is a zoomed-in view of a portion of sectional view shown in FIG. 9.
Figure 10:
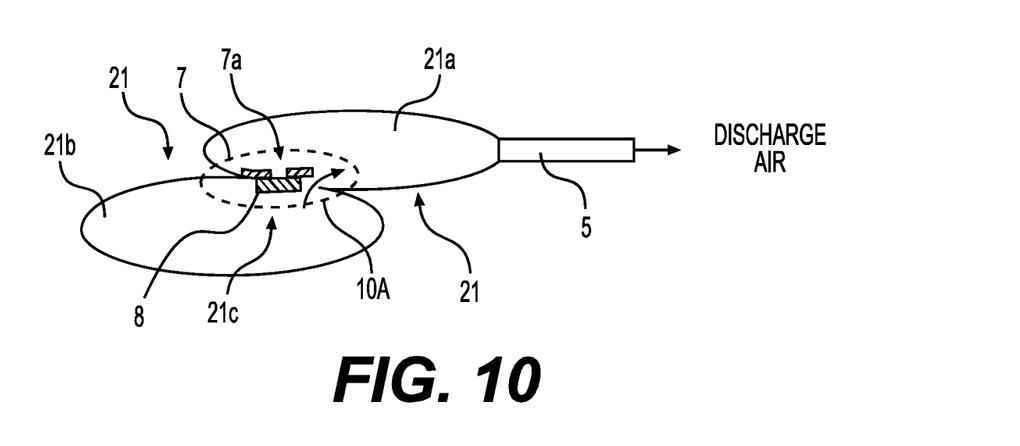
FIG. 10 is a sectional view illustrating operation of a valve in a case where the air is discharged from the air bags of the massage apparatus in FIG. 7.
Figure 10A:
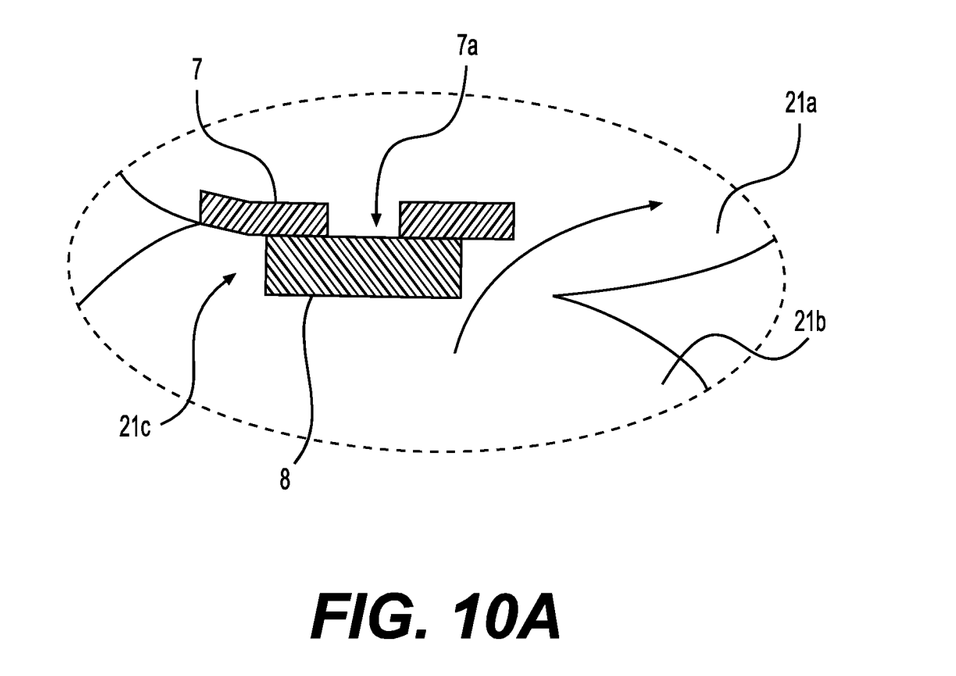
FIG. 10A is a zoomed-in view of a portion of sectional view shown in FIG. 10.

FIGS. 7 and 7A a sectional view of a pair of air bags 21 according to Embodiment 2. FIG. 8 is a plan view of the air bags 21 as viewed from a top. FIGS. 9 and 9A illustrate operation of a valve 8 in a case where air is injected into the air bags 21, and FIGS. 10 and 10A illustrate operation of a valve 7 in a case where the air is discharged from the air bags 21. Other configurations of this embodiment are similar to the configurations of Embodiment 1 except that the valves 7, 8 are provided in the coupling section 21d of the pair of air bags 21. In FIG. 7 to FIG. 10, a base, a contour line, fixing sections, and mounting sections are omitted in order to simplify the description.

The coupling section 21d of the pair of air bags 21 according to this embodiment has two through holes 21c, 7a for communicating the pair of air bags 21 with each other, and the two valves 7, 8 for opening and closing the two through holes 21c, 7a, respectively. The valve (first valve) 8 opens the through hole (first through hole) 7a when air is injected from an air injection and discharge tube 5, and closes the through hole 7a when the air is discharged. The valve (second valve) 7 opens the through hole (second through hole) 21c when the air is discharged from the air injection and discharge tube 5, and closes the through hole 21c when the air is injected. In this embodiment, the inflow amount of air to the lower air bag (second air bag) 21b is decreased when the air bags 21 expand, and the outflow amount of air from the lower air bag 21b is increased when the air bags 21 contract. Therefore, the through hole 21c opened and closed by the valve 7 is formed such that a diameter D3 of the through hole 21c is made larger than a diameter D4 of the through hole 7a opened and closed by the valve 8, as illustrated in FIG. 8.

In this embodiment, as illustrated in FIGS. 7 and 7A, the through hole 7a is provided in a main body of the valve 7, the main body of the valve 7 has one edge fixed to an inner wall surface of the upper air bag (first air bag) 21a, and has other edge which is a free edge. For example, a part of the main body of the valve 7 is welded to the vicinity of the through hole 21c outside the through hole 21c. The shape of the main body of the valve 7 is a rectangle in this embodiment, but is not limited to this. The shape of the main body of the valve 7 may be any shape having a portion fixed to the valve main body, and having other portion which is free. The main body of the valve 7 can be made of a material having flexibility and elasticity.

The valve 8 is provided so as to open and close the through hole 7a provided in the main body of the valve 7 in the direction opposite to the opening and closing direction of the valve 7. More specifically, when opening the through hole 21c, the valve 7 is provided so as to open to the inside of the upper air bag 21a as illustrated in FIGS. 10 and 10A. Additionally, when opening the through hole 7a, the valve 8 is provided so as to open to the inside of the lower air bag 21b as illustrated in FIGS. 9 and 9A. That is, the valve 8 is provided on a side opposite to a side, on which the valve 7 opens and closes, of the main body of the valve 7. Additionally, the main body of the valve 8 has one edge fixed (for example, welded) to a portion outside the through hole 7a, and has other edge which is a free edge. The shape of the main body of the valve 8 is a rectangle in this embodiment, but is not limited to this. The shape of the main body of the valve 8 may be any shape having a portion fixed to the valve main body, and other portion which is free. The main body of the valve 8 can be made of a material having flexibility and elasticity.

When air is injected, the valve 7 is closed, and the valve 8 which closes the through hole 7a opens, so that air flows into the lower air bag 21b, as illustrated in FIGS. 9 and 9A. However, the diameter D4 of the through hole 7a is relatively smaller than the diameter D3 of the through hole 21c, and therefore the air bags 21 slowly expand. Accordingly, it is possible to obtain slow massage feeling. When the air is discharged, the valve 7 opens, the air quickly escapes from the lower air bag 21b through the relatively large through hole 21c of the coupling section as illustrated in FIGS. 10 and 10A, and therefore the air bags 21 quickly contracts, so that it is possible to obtain massage feeling where a hand is quickly separated.

In this embodiment, when air is injected, and the lower air bag 21b is expanded, the air passes through the through hole 7a to flow into the lower air bag 21b from the upper air bag 21a. Accordingly, in this embodiment, the upper air bag 21a expands, and the lower air bag 21b then expands, and therefore the through hole 7a is formed such that the diameter D4 of the through hole 7a is made smaller to the inner diameter D2 of the air injection and discharge tube 5 as illustrated in FIG. 8.

This application claims the conventional priority based on Japanese Patent Application No. 2014-167038 filed on Aug. 20, 2014, and incorporates the contents to become a part of this application.

REFERENCE SIGNS LIST 1, 21 air bag
1a, 21a upper air bag (first stage, first air bag)
1b, 21b lower air bag (second stage, second air bag)
1c through hole
1d, 21d coupling section
2 base
3 fixing section
4 mounting member
5 air injection and discharge tube
6 contour line
6a maximum weight applied point when an upper air bag expands
6b maximum weight applied point when a lower air bag expands
7 valve (second valve)
8 valve (first valve)
7a through hole (first through hole)
10, 20 massage apparatus
11 operation unit
12 control unit
13 pump
21c through hole (second through hole)
100 massager
E solenoid valve

The invention claimed is:

1. A massage apparatus comprising:
a base;
a pair of air bags including a first air bag and a second air bag, part of the first air bag and the second air bag being vertically overlapped with each other at an overlapped site and center portions of the first air bag and the second air bag are not overlapped, the first air bag being disposed on an upper side of the second air bag, and the first air bag and the second air bag being joined to each other at the overlapped site; and an air injection and discharge section arranged to be connected to the first air bag, inject air into the first air bag, and discharge the air from the first air bag, wherein a coupling section including a first through hole and a second through hole arranged to communicate the pair of air bags with each other is provided at the site where the pair of air bags are joined to each other, the coupling section further including a first valve arranged to open and close the first through hole, and a second valve arranged to open and close the second through hole, the first through hole being provided on the second valve, and a fixing section fixed to the base and arranged to rotatably fix the first air bag to the base is provided in contact with a portion of the first air bag, the portion being not overlapped with the second air bag, the first valve is arranged to open when injecting the air from the air injection and discharge section, and closes when discharging the air by the air injection and discharge section, the second valve is arranged to open when discharging the air from the air injection and discharge section, and close when injecting the air from the air injection and discharge section, and a diameter of the second through hole is larger than a diameter of the first through hole.

2. The massage apparatus according to claim 1, wherein the first air bag is arranged to expand in accordance with the air injected from the air injection and discharge section, the second air bag is arranged to expand in accordance with an air that flows in from the first air bag through the coupling section after the expansion of the first air bag, and push the first air bag up to rotate the first air bag with the fixing section as an axis, the first air bag is arranged to contract in accordance with the air discharged by the air injection and discharge section, and the second air bag is arranged to contract in accordance with an air discharged through the coupling section after the contraction of the first air bag.

3. The massage apparatus according to claim 1, wherein a diameter of the through hole of the coupling section is smaller than a diameter of the air injection and discharge section.

4. The massage apparatus according to claim 1, wherein the first through hole is provided in a main body of the second valve, and the second valve has one edge fixed to an inner wall surface of the first air bag.

5. The massage apparatus according to claim 1, wherein the first valve is provided so as to open the first through hole in a direction opposite to an opening direction of the second valve, and close the first through hole in a direction opposite to a closing direction of the second valve.

6. The massage apparatus according to claim 1, wherein a diameter of the first through hole is smaller than a diameter of the air injection and discharge section.

7. The massage apparatus according to claim 1, wherein air storage capacity of the second air bag is larger than air storage capacity of the first air bag.

* * * * *